UNITED STATES PATENT OFFICE 2,655,445

3-(HALOPHENYL)-1-METHYL-1-(METHYL OR ETHYL) UREAS AND HERBICIDAL COMPOSITIONS AND METHODS EMPLOYING SAME

Charles W. Todd, Wilmington, Del., assignor to E. I. du Pont de Nemours & Company, Wilmington, Del., a corporation of Delaware No Drawing. Application February 14, 1952, Serial No. 271,632

17 Claims. (Cl. 71—2.6)

This invention relates to methods for killing or preventing weeds, or undesirable plant growth, and to compositions employed in practicing such methods.

This application is a continuation-in-part of my copending applications: Serial No. 131,498, filed December 6, 1949; Serial No. 186,118, filed September 21, 1950; Serial No. 231,061, filed June 11, 1951; Serial No. 231,062, filed June 11, 1951; and Serial No. 228,992, filed May 29, 1951, all of which are now abandoned except application Serial No. 186,118.

The herbicidally active compounds of the invention are substituted ureas represented by the formula:

(1) 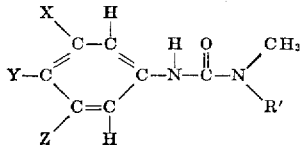

where R' is an alkyl radical up to two carbon atoms, i. e., methyl or ethyl; X and Z are selected from hydrogen and halogen; Y is hydrogen, halogen, alkyl, or alkoxy, the alkyl radical in said alkyl and alkoxy substituents containing up to four carbon atoms; and at least one and at most two of X, Y, and Z being halogen, i. e., the benzene nucleus is mono- or dihalo substituted.

It will be seen that the herbicidally active compounds of the invention are further characterized by having hydrogen on each carbon ortho to the —NHCON(CH₃)R' group. In other words, they are non-ortho substituted. Further, any alkyl, or alkoxy group attached to a nuclear carbon is in the para position. An additional class characteristic of the compounds is that they are all tri-substituted ureas, the aromatic group being the only substituent of the urea nitrogen atom to which it is bonded.

R' in Formula 1 above is preferably methyl, Y is preferably hydrogen, chlorine, methyl, ethyl, or methoxy, and halogen substituents on the benzene nucleus are preferably chlorine.

The herbicidally active compounds of the invention are prepared by the reaction of an appropriate mono- or dihalo-substituted phenyl isocyanate with dimethyl or methylethyl amine.

The following equation showing specific reactants illustrates the reaction:

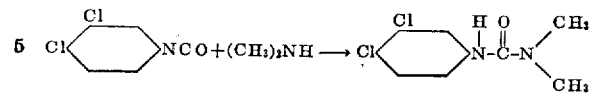

The amine-isocyanate reaction is most readily carried out in the presence of an inert solvent, such as, toluene, anisole, benzene, chlorobenzene, or dioxane. No catalyst is needed, and since the reaction is exothermic it is ordinarily unnecessary to supply heat. Thus the reaction is conveniently carried out by first mixing the isocyanate with the inert solvent at room temperature and then gradually adding the secondary amine reactant while permitting the temperature to increase thru the range of say 25 to 75° C. The tri-substituted urea products are generally quite insoluble in the solvent used and, therefore, precipitate out as formed and are readily separated from the reaction mass.

The halophenyl dialkyl ureas of the invention are white crystalline solids. They are insoluble or only slightly soluble in water and cold benzene and, in general, appreciably soluble in dioxane, acetone, ethylacetate, ethanol, and hot benzene.

The halophenyl isocyanates used as starting materials can be prepared by the general method described in the literature [Vittenet, Bull., Soc. Chim. /3/ 21, 586, 954 (1899); Organic Synthesis, Collective, vol. II, page 453; and U. S. Patent 2,428,843] which consists in heating the haloaryl carbamyl chloride first obtained by treating the haloaryl primary amine with phosgene at ordinary temperature in the presence of an appropriate solvent or reaction media.

Illustrative of the herbicidally active compounds of the invention represented by Formula 1 above are:

3-(m-chlorophenyl)-1,1-dimethylurea
3-(p-chlorophenyl)-1-methyl-1-ethylurea
3-(p-chlorophenyl)-1,1-dimethylurea
3-(p-iodophenyl)-1,1-dimethylurea
3-(3,4-dichlorophenyl)-1,1-dimethylurea
3-(3-chloro-p-tolyl)-1,1-dimethylurea
3-(3,5-dichloro-p-tolyl)-1,1-dimethylurea
3-(3-chloro-4-isopropoxyphenyl)-1,1-dimethylurea 3 - (3,5 - dichloro - 4 - methoxyphenyl)-1,1-dimethylurea
3-(3-chloro-4-tert. butylphenyl) - 1,1 - dimethylurea
3-(3-chloro-4-methoxyphenyl)-1,1-dimethylurea
3-(p-fluorophenyl)-1,1-dimethylurea
3-(p-bromophenyl)-1,1-dimethylurea
3-(p-bromophenyl)-1-methyl-1-ethylurea
3-(m-fluorophenyl)-1,1-dimethylurea
3-(m-chlorophenyl)-1-methyl-1-ethylurea
3-(m-bromophenyl)-1,1-dimethylurea
3-(3,4-dichlorophenyl)-1-methyl-1-ethylurea
3-(3-bromo-4-chlorophenyl)-1,1-dimethylurea
3-(3-fluoro-4-chlorophenyl)-1,1-dimethylurea
3-(3,5-dichlorophenyl)-1,1-dimethylurea
3-(3-bromo-p-tolyl)-1,1-dimethylurea
3-(3-chloro-p-tolyl)-1-methyl-1-ethylurea
3-(3-chloro-4-ethylphenyl)-1,1-dimethylurea
3-(3-chloro-4-isopropylphenyl)-1,1-dimethylurea
3-(3-bromo-4-ethylphenyl)-1,1-dimethylurea
3-(3-chloro-4-sec. butylphenyl)-1,1-dimethylurea
3-(3-chloro-4-ethoxyphenyl)-1,1-dimethylurea
3-(3 - chloro-4-sec. butoxyphenyl)-1,1-dimethylurea
3-(3-chloro-4-ethylphenyl) - 1 - methyl-1-ethylurea
3-(3,5-dibromo-p-tolyl)-1,1-dimethylurea
3-(3,5-dichlor-p-tolyl)-1-methyl-1-ethylurea
3 - (3,5 - dibromo - 4 - methoxyphenyl)-1,1-dimethylurea
3 - (3,5 - dichloro - 4 - isopropoxyphenyl)-1,1-dimethylurea
3-(3,5-dichloro-4-ethylphenyl)-1,1-dimethylurea
3 - (3,5 - dichloro - 4 - sec. butylphenyl)-1,1-dimethylurea For application of the herbicidally active compounds of the invention, the compounds are preferably admixed with a carrier material or conditioning agent of the kind used and referred to in the art as a pest control adjuvant or modifier in order to provide formulations adopted for ready and efficient application to soil, weeds, or unwanted plants using conventional applicator equipment.

Thus, one or more of the herbicidally active compounds of the invention are admixed with carrier or adjuvant materials to provide formulations in liquid or solid form. For example, solutions of the compounds of the invention in organic solvents, such as cyclohexanol, furfural, acetone, isobutanol, ethanol, isopropylacetate, and the like can be applied directly as herbicides. More economical and practical formulations are prepared by admixing or dispersing the herbicidally active compounds with a non-solvent carrier which may be either solid or liquid.

Thus, herbicidal dust compositions are compounded to give homogeneous free-flowing dust by admixing the active compounds with finely divided solids, preferably, talcs, natural clays, pyrophyllite, diatomaceous earth, and flours such as walnut shell, wheat, redwood, soya bean, and cottonseed flours. Other inert solid carriers which can be used to prepare the herbicidal formulations include magnesium and calcium carbonates, calcium phosphate, sulfur, lime, etc. either in powder or granular form. The percentage by weight of the essential active ingredients will vary according to the manner in which the composition is to be applied but, in general, will be 0.5 to 95% by weight of the herbicidal composition.

Liquid herbicidal compositions can contain, for example, one of the active herbicidal compounds of the invention dispersed in water or other non-solvent carrier. To secure such homogeneous dispersions, a surface-active agent is used. In fact, the preferred herbicidal compositions of this invention whether in liquid or in solid form contain the herbicidally active compound homogeneously admixed with a surface-active agent sometimes referred to in the art as wetting, dispersing or penetrating agents. These agents, which will be referred to hereinafter more simply as surface-active dispersing agents, cause the compositions to be easily dispersed in water to give aqueous sprays which, for the most part, constitute a desirable method of application.

The surface-active dispersing agents employed can be of the anionic, cationic or nonionic type and include, for example, sodium and potassium oleates, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene/carbon monoxide polymers, laurylamine hydrochloride, laurylpyridinium bromide, stearyltrimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually the minimum lower concentration will be 0.1%.

The herbicidal compositions of the invention can also have incorporated therein oils, fats or similar vehicles such as cottonseed oil, olive oil, lard, paraffin oil, hydrogenated vegetable oils, etc. Adhesives such as gelatin, blood albumin, resins, for example, rosin, alkyd resins and the like, can also be used in certain compositions to increase retention or tenacity of deposits following application.

Water-dispersible liquid compositions can be prepared by incorporating with the ureas and surface-active dispersing agents various organic liquids such as furfural, methanol, isopropanol, isobutanol, xylol, cresol, cyclohexanone, acetone, methyl ethyl ketone, kerosene, trichloroethylene, dimethylformamide, dimethylacetamide, alkylated naphthalenes, and the like. Such compositions are readily dispersible in water and provide excellent aqueous herbicidal sprays for field application. The proportion of surface-active dispersing agent to urea can be 0.1 to 100% by weight in these water-dispersible herbicidal compositions.

The herbicidal compositions are applied either as a spray or a dust to the locus or area to be protected from undesirable plant growth, commonly called weeds, i. e., plants growing where they are not wanted. Such application can be made directly upon the locus or area and the weeds thereon during the period of weed infestation in order to destroy the weeds, or alternatively, the application can be made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil. For some purposes, as in the treatment of ponds and lake bottoms, it will be convenient to use a pellet form of the composition.

The active ingredients are, of course, applied in amount sufficient to exert the desired herbicidal action. The amount of herbicidally active compounds present in the compositions as actually applied for destroying or preventing weeds will vary with the herbicidal activity of the active ingredients, the purpose for which the application is being made (i. e., whether for short term or long term control), the manner of application, the particular weeds for which control is sought, and like variables. Certain of the specific examples to follow will illustrate various kinds and amounts of application and the results obtained thereby. In general, the herbicidal compositions as applied in the form of a spray or a dust will contain from about 0.02% to 95% by weight of herbicidally active ingredient.

The class of herbicidally active compounds of this invention has characteristics which make the compounds especially valuable for certain herbicidal uses. They are extremely potent herbicidal agents and show a persistence in the soil which makes them well suited for application to railroad right-of-ways, drainage ditches, power transmission line right-of-ways, and the like where complete kill of plant growth for extended periods of time is desirable.

The solid and liquid compositions described and employed herein for application of the essential active herbicidal ingredient all have the common property of permitting application of the herbicidal compositions through suitable jets, nozzles, or spreaders adapted to the handling of granular materials onto the plants being treated and will, for convenience, be designated as "fluent carriers." The fluent carriers with which this invention is primarily concerned are non-solvent fluent carriers.

In another method of application for weed control, the ureas are incorporated with fertilizers to form either powdery or granular herbicidal compositions that can be used in the cultivation of agricultural crops.

In order that the invention may be better understood, the following examples are given in addition to the examples already given above. The examples illustrate typical compounds of the invention, methods for their preparation, herbicidal formulations employing such compounds, herbicidal applications, and the results obtained.

EXAMPLE 1

*3-(p-chlorophenyl)-1,1-dimethylurea*

Anhydrous hydrogen chloride was passed into a solution of 191.2 parts by weight of p-chloroaniline in 1550 parts by weight of dioxane until in excess. The reaction temperature was permitted to rise to 70–75° C. during the addition, and after the solution was saturated, phosgene was passed into the slurry at the same temperature until a clear solution of p-chlorophenyl isocyanate was obtained (about 4 hours). The excess phosgene and hydrogen chloride were removed by distillation of approximately 300 parts by weight of the dioxane. After cooling to 25° C., dimethylamine was passed into the reaction mixture at 25–40° until present in excess. The slurry was cooled to 10° and 3-(p-chlorophenyl)-1,1-dimethylurea (261.5 parts by weight; 88% yield) removed by filtration.

Dilution of the filtrate with water gave an additional 19.1 parts by weight of 3-(p-chlorophenyl)-1,1-dimethylurea, increasing the total yield of crude product (M. P. 164.5–168°) to 280.6 parts by weight or 94.5% of theory. Recrystallization of a portion of the crude product from 95% aqueous methanol resulted in 76% recovery of shiny white scales which melted at 170.5–171.2°.

*Analysis.*—Calc. for $C_9H_{11}ClN_2O$: C, 54.45; H, 5.55; N, 14.10. Found: C, 54.47; H, 5.72; N, 14.10.

EXAMPLE 2

*3-(3,4-dichlorophenyl)-1,1-dimethylurea*

3,4-dichlorophenyl isocyanate was prepared by passing phosgene into a slurry of 40.8 parts by weight of 3,4-dichloroaniline hydrochloride in about 260 parts by weight of dioxane at 75–85° C. until a clear solution of the isocyanate was obtained (about 1.3 hours). The excess phosgene and hydrogen chloride were removed from the reaction mass by distillation of approximately 100 parts by weight of the dioxane.

The resulting undistilled mixture was then cooled to 18° C. and dimethylamine was passed into it rapidly at 18–34° C. until present in excess. The mixture was poured into 500 parts by weight of water and the excess amine neutralized by the addition of dilute hydrochloric acid.

After cooling, the crystalline 3-(3,4-dichlorophenyl)-1,1-dimethylurea which precipitated was removed by filtration, washed with water and cold ethyl alcohol, then recrystallized from 235 parts by weight of ethyl alcohol. 27.1 parts by weight of recrystallized product was obtained having a melting point of 153–4° C. Additional 3-(3,4-dichlorophenyl)-1,1-dimethylurea having the same melting point was obtained by recrystallization of additional crude product recovered by concentration of the mother liquor. The combined yield amounted to 61% of the theoretical yield.

*Analysis.*—Calc. for $C_9H_{10}Cl_2N_2O$: N, 12.02; Cl, 30.45. Found: N, 12.02; Cl, 29.79.

EXAMPLE 3

*3-(m-chlorophenyl)-1,1-dimethylurea*

Dimethylamine was passed into a solution of 46.1 parts by weight of m-chlorophenyl isocyanate in 110 parts by weight of absolute ether until present in excess. The reaction mixture was heated to reflux for three minutes, cooled, and white crystalline 3-(m-chlorophenyl)-1,1-dimethylurea precipitated and was separated and dried in a vacuum oven at 50° over phosphoric anhydride. The yield was 57.5 parts by weight (96.5%); M. P. 144.3–144.8° C.

*Analysis.*—Calc. for $C_9H_{11}ClN_2O$: Cl, 17.87. Found: Cl, 17.90; 17.97.

EXAMPLE 4

*3-(p-chlorophenyl)-1-ethyl-1-methylurea*

A solution of 69 parts by weight of p-chlorophenyl isocyanate in 50 parts by weight of dry dioxane was added dropwise with stirring to a suspension of 50 parts by weight of methylethylamine hydrochloride and 21.5 parts by weight of sodium hydroxide in 200 parts by weight dry dioxane. Heat was liberated during this addition.

The reaction mixture was poured into 1000 parts by weight of water and the precipitated 3-(p-chlorophenyl)-1-ethyl-1-methylurea was removed by filtration and dried in a vacuum oven at 50° C.

The product after drying weighed 83 parts by weight (87% yield) and melted at 146.5 to 147° C. This material was recrystallized from 1200 parts by weight of benzene to yield 48 parts by weight (58% recovery) of pure 3-(p-chlorophenyl)-1-ethyl-1-methylurea melting at 149.0 to 149.5° C.

*Analysis.*—Calc. for $C_{10}H_{13}ClN_2O$: C, 56.50; H, 6.15. Found: C, 56.67; H, 6.03.

EXAMPLE 5

*3-(3-chloro-p-tolyl)-1,1-dimethylurea*

A solution of 35.4 parts by weight of 3-chloro-p-toluidine dissolved in about 100 parts by weight of anisole was added dropwise with stirring to a solution of 27.0 parts by weight of phosgene dissolved in 100 parts by weight of anisole. This addition was made at room temperature under anhydrous conditions. A clear solution of 3-chloro-p-tolyl isocyanate was obtained by heating the above mixture at reflux temperature until hydrochloric acid no longer evolved from the reaction (about 1.5 hours).

The resulting solution was cooled to 20° C. and 13.0 parts by weight of dimethylamine was passed into it at 20°–30°. This mixture was heated until all the material was in solution. After cooling, the crystalline 3-(3-chloro-p-tolyl)-1,1-dimethylurea which precipitated was collected by filtration and recrystallized from 100 parts by weight of toluene. A total of 37.8 parts by weight of recrystallized product (representing 71% of the theoretical yield) was obtained having a melting point of 143°–145° C.

*Analysis.*—Calc. for $C_{10}H_{13}ClN_2O$: Cl, 16.71. Found: Cl, 16.44.

EXAMPLE 6

*3-(3,5-dichloro-4-methoxyphenyl)-1,1-dimethylurea*

A solution of 12.0 parts by weight of 3,5-dichloro-4-methoxyaniline in about 100 parts by weight of anisole was added dropwise with stirring to a solution containing 7.0 parts by weight of phosgene in 50 parts by weight of anisole. This addition was made at room temperature under anhydrous conditions. The mixture was heated and maintained at reflux temperature until hydrochloric acid ceased to evolve from the reaction and a clear solution of the isocyanate was obtained (about 1.5 hours).

The resulting solution was then cooled to 20° C. and dimethylamine was passed into it at 20°–30° C. until present in excess. The reaction was heated at reflux temperature for a period of about one-half hour. After cooling, the crystalline 3-(3,5-dichloro-4-methoxyphenyl)-1,1-dimethylurea which precipitated was separated by filtration, and recrystallized from 150 parts by weight of heptane. A total of 13.0 parts by weight of recrystallized product was obtained having a melting point of 192° C. This material represented 79% of the theoretical yield.

*Analysis.*—Calc. for $C_{10}H_{12}Cl_2N_2O_2$: N, 10.64; Cl, 27.00. Found: N, 10.64; Cl, 27.23.

Additional examples of the herbicidally active compounds of this invention prepared according to the foregoing methods are given in the following table:

TABLE

| Name of Compound | Reactants | |
|---|---|---|
| | Isocyanate | Amine |
| Example 7:<br>3-(3-chloro-4-methoxyphenyl)-1,1-dimethylurea.<br>M. P. 124–5° C., yield 71%.<br>Calc'd. for $C_{10}H_{13}ClN_2O_2$: Cl, 15.57.<br>Found: Cl, 15.73. | 3-chloro-4-methoxyphenyl. | Dimethyl. |
| Example 8:<br>3-(p-fluorophenyl)-1,1-dimethylurea.<br>M. P. 128–9° C., yield 64%.<br>Calc'd. for $C_9H_{11}FN_2O$: N, 15.37; F, 10.42.<br>Found: N, 14.60; F, 10.0. | p-fluorophenyl | Do. |
| Example 9:<br>3-(p-bromophenyl)-1,1-dimethylurea.<br>M. P. 170–170.5° C., yield theoretical.<br>Calc'd. for $C_9H_{11}BrN_2O$: N, 11.52; Br, 32.85.<br>Found: N, 11.60; Br, 32.78. | p-bromophenyl | Do. |
| Example 10:<br>3-(m-fluorophenyl)-1,1-dimethylurea.<br>M. P. 127.5–8.0° C., yield 67%.<br>Calc'd. for $C_9H_{11}FN_2O$: N, 15.37; F, 10.42.<br>Found: N, 15.22; F, 10.7. | m-fluorophenyl | Do. |
| Example 11:<br>3-(m-bromophenyl)-1,1-dimethylurea.<br>M. P. 150.5–1.5, yield 99%.<br>Calc'd. for $C_9H_{11}BrN_2O$: N, 11.52; Br, 32.85.<br>Found: N, 11.58; Br, 33.61. | m-bromophenyl | Do. |

EXAMPLE 12

*Dust formulations*

The following compositions are adapted for direct application as dusts for the destruction or prevention of weeds using conventional dusting equipment. The dusts are made by blending or mixing the ingredients and grinding the mix to give compositions having an average particle size less than about 50 microns.

A

| | |
|---|---|
| 3-(3,4-dichlorophenyl)-1,1-dimethylurea | 20 |
| Talc | 80 |
| | 100 |

B

| | |
|---|---|
| 3-(3-chloro-p-tolyl)-1-ethyl-1-methylurea | 5 |
| Cottonseed oil | 4 |
| Walnut shell flour | 91 |
| | 100 |

EXAMPLE 13

*Water-dispersible powders*

The following powdered compositions are adapted for dispersing in water for application as a spray for the destruction and prevention of weeds. The powdered compositions are made by intimately mixing the listed ingredients using conventional mixing or blending equipment and then grinding the mixture to give a powder having an average particle size less than about 50 microns.

A

| | |
|---|---|
| 3-(3,4-dichlorophenyl)-1,1-dimethylurea | 75 |
| Fuller's earth | 23.75 |
| Sodium lauryl sulfate, 50% (wetting agent) | 1 |
| Methyl cellulose, 15 cps. (dispersing agent) | .25 |
| | 100 |

B

| | |
|---|---|
| 3-(p-chlorophenyl)-1,1-dimethylurea, tech. | 86 |
| Fuller's earth | 12 |
| Isopropyl naphthalene sulfonate, sodium salt (wetting agent) | 1.75 |
| Methyl cellulose, 15 cps. (dispersing agent) | .25 |
| | 100 |

EXAMPLE 14

*Oil-water dispersible powders*

The following powdered compositions are adapted for use in the preparation of spray compositions using either an oil, water, or a combination of oil and water as the liquid diluent. The powders are made by mixing and grinding as in the case of the powders of Example 12.

A

| | |
|---|---|
| 3-(3,5-dichloro-p-tolyl)-1,1-dimethylurea | 70 |
| Alkylated aryl polyether alcohol (wetting and dispersing agent) | 4 |
| Fuller's earth | 26 |
| | 100 |

B

| | |
|---|---|
| 3-(3-chloro-4-methoxyphenyl)-1,1-dimethylurea | 80 |
| Ethylene oxide stearate-laurate (emulsifying agent) | 4 |
| Pyrophyllite | 16 |
| | 100 |

EXAMPLE 15

*Water-dispersible liquid compositions*

The following compositions are in a liquid form and are adapted for addition to water to give aqueous dispersions for application as sprays. The urea herbicides are generally quite insoluble in most oils. Therefore, the liquid compositions ordinarily are not complete solutions but rather are dispersions of solid in an oil. The liquid or fluid compositions shown are prepared by thoroughly mixing and dispersing active compounds and conditioning agent or agents in an organic liquid diluent.

A

| | |
|---|---|
| 3-(m-chlorophenyl)-1,1-dimethylurea | 25 |
| Long chain fatty alcohol sulfate (emulsifying agent) | 2 |
| Goulac (dispersing agent) | 3 |
| Kerosene | 70 |
| | 100 |

B

| | |
|---|---|
| 3(p-bromophenyl)-1,1-dimethylurea | 30 |
| Alkylated aryl polyether alcohol (wetting and emulsifying agent) | 3 |
| Methyl cellulose (dispersing agent) | 1 |
| Kerosene | 66 |
| | 100 |

EXAMPLE 16

*Granular compositions*

The following compositions are adapted for application by a means of a fertilizer spreader apparatus or similar equipment. The compositions are readily prepared by mixing the ingredients with water to form a paste. The paste is then extruded, dried, and ground to give the desired granular size. Preferably, the granules will be in the order of one-thirty second to one-quarter inch diameter.

A

| | |
|---|---|
| 3-(p-chlorophenyl)-1-ethyl-1-methylurea | 10 |
| Goulac (dispersing agent) | 3 |
| Hydrocarbon oil | 1 |
| Dextrin (binding agent) | 20 |
| Fuller's earth | 66 |
| | 100 |

B

| | |
|---|---|
| 3-(3-chloro-4-sec. butylphenyl)-1,1-dimethylurea | 7 |
| Goulac | 3 |
| Refined kerosene | 1 |
| Gelatin | 25 |
| Talc | 64 |
| | 100 |

The following examples illustrate herbicidal applications and results obtained.

EXAMPLE 17

A water dispersible powder was prepared by thoroughly mixing 75 parts of 3-(p-chlorophenyl)-1,1-dimethylurea, 1 part of sodium lauryl sulfate, 3 parts of sodium salt of lignin sulfonic acid (goulac) and 21 parts of clay (Attaclay). Aqueous dispersions of this powder were sprayed on established stands of quack grass, nut grass, Bermuda grass and Johnson grass to run off point, and minimum concentration required to effect complete kill of both the aerial parts and the entire root system of these plants, including the "nutlets" of the nut grass and the rhizomes of the Johnson grass, was determined at the end of eleven weeks to be as follows:

| | Percent |
|---|---|
| Quack grass | 0.5 |
| Nut grass | 3 |
| Bermuda grass | 1 |
| Johnson grass | 1 |

A 10% aqueous solution of sodium trichloroacetate, a compound currently marketed as a herbicidal agent, sprayed on the foregoing plants failed to kill any of them.

EXAMPLE 18

For pre-emergence weed control a plot seeded with cotton and naturally infested with weed seeds was treated with an aqueous spray of the water dispersible powder described in Example 17 at the rate of one pound of the urea per acre. Approximately 4 weeks from the time of application, it was observed that essentially 100% control of weeds had been achieved. The cotton suffered slight but only temporary injury. A similar treatment with sodium trichloroacetate at five pound per acre was not as effective.

Following is a tabulation of results obtained with formulations of various herbicidally active compounds of the invention. In each case, the formulation employed contained 80% by weight of the herbicidally active compound, 18% by weight of powdered solid diluent, and 2% by weight of wetting and dispersing agents.

Formulations of each of the compounds were dispersed in water to give aqueous spray compositions containing various concentrations of each of the active ingredients. Each aqueous dispersion was sprayed on three-month old quack grass plants from root cuttings and on six-week old Johnson grass seedlings to the run-off point. The per cent concentration shown below for each plant species was the concentration of the herbicidally active compound in the aqueous dispersion sprayed on the plants which was sufficient to effect kill of the Johnson grass seedings in five weeks and the kill of the quack grass in three months.

| Example | Compound | Johnson grass seedlings | Quack grass |
|---|---|---|---|
|  |  | Percent | Percent |
| 19 | 3-(p-chlorophenyl)-1-methyl-1-ethyl-urea | 1 | 1 |
| 20 | 3-(p-bromophenyl)-1,1-dimethylurea | 1 | 0.5 |
| 21 | 3-(3,4-dichlorophenyl)-1,1-dimethyl-urea | 1 | 1 |
| 22 | 3-(3-chloro-p-tolyl)-1,1-dimethylurea | 1 | 0.5 |

Those skilled in the art will appreciate that other herbicidally active compounds of the class defined herein can be prepared, formulated, and applied in accordance with the foregoing specific examples. Thus, the foregoing detailed description has been given for clearness of understanding only and no unnecessary limitations are to be understood therefrom.

I claim:
1. A method for the destruction and prevention of weeds which comprises applying to a locus to be protected, in amount sufficient to exert a herbicidal action, a trisubstituted urea represented by the formula

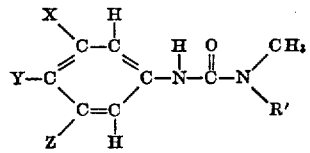

where R' is an alkyl radical up to two carbon atoms, X and Z are selected from the group consisting of hydrogen and halogen, and Y is selected from the group consisting of hydrogen, halogen, alkyl and alkoxy, the alkyl radical in said alkyl and alkoxy substituents containing up to four carbon atoms, at least one and at most two of X, Y, and Z being halogen.

2. A composition suitable for destroying weeds comprising a carrier material and, in amount sufficient to exert a herbicidal action, a trisubstituted urea represented by the formula

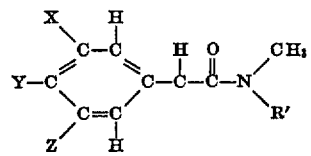

where R' is an alkyl radical up to two carbon atoms, X and Z are selected from the group consisting of hydrogen and halogen, and Y is selected from the group consisting of hydrogen, halogen, alkyl and alkoxy, the alkyl radical in said alkyl and alkoxy substituents containing up to four carbon atoms, at least one and at most two of X, Y, and Z being halogen.

3. A composition of claim 2 in which said carrier material is a finely divided inert solid.

4. A composition of claim 3 containing a surface active dispersing agent in amount sufficient to impart water dispersibility to the composition.

5. A composition of claim 2 in which said carrier material is a liquid.

6. A composition of claim 5 containing a surface active dispersing agent in amount sufficient to impart water dispersibility to the composition.

7. A composition of claim 2 containing a surface active dispersing agent in amount sufficient to impart water dispersibility to the composition.

8. A herbicidally active trisubstituted urea compound represented by the formula

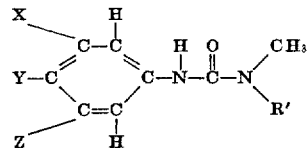

where R' is an alkyl radical up to two carbon atoms, X and Z are selected from the group consisting of hydrogen and halogen, and Y is selected from the group consisting of hydrogen, halogen, alkyl and alkoxy, the alkyl radical in said alkyl and alkoxy substituents containing up to four carbon atoms, at least one and at most two of X, Y, and Z being halogen.

9. A 3-(chlorophenyl) - 1,1 - dimethylurea in which the ortho positions of the chlorophenyl radical are unsubstituted.

10. A 3-(chloro-p-tolyl) - 1,1 - dimethylurea in which the ortho positions of the chloro-p-tolyl radical are unsubstituted.

11. 3-(p-chlorophenyl)-1,1-dimethylurea.
12. 3-(m-chlorophenyl)-1,1-dimethylurea.
13. 3-(3,4-dichlorophenyl)-1,1-dimethylurea.

14. A composition of claim 2 containing a surface-active dispersing agent in amount sufficient to impart water dispersibility to the composition and, as the trisubstituted urea, the compound 3-(p-chlorophenyl)-1,1-dimethylurea.

15. A composition of claim 2 containing a surface-active dispersing agent in amount sufficient to impart water dispersibility to the composition and, as the trisubstituted urea, the compound 3-(3,4-dichlorophenyl)-1,1-dimethylurea.

16. A method for the destruction and prevention of weeds which comprises applying to a locus to be protected, in amount sufficient to exert a herbicidal action, the compound 3-(p-chlorophenyl)-1,1-dimethylurea.

17. A method for the destruction and prevention of weeds which comprises applying to a locus to be protected, in amount sufficient to exert a herbicidal action, the compound 3-(3,4-dichlorophenyl)-1,1-dimethylurea.

CHARLES W. TODD.

References Cited in the file of this patent
UNITED STATES PATENTS

| Number | Name | Date |
|---|---|---|
| 2,029,959 | Urbain | Feb. 4, 1936 |
| 2,210,442 | Balle | Aug. 6, 1940 |

(Other references on following page)

UNITED STATES PATENTS

| Number | Name | Date |
|---|---|---|
| 2,280,756 | Sankaitis | Apr. 21, 1942 |
| 2,322,761 | Lontz | June 29, 1943 |
| 2,341,868 | Hitchcock et al. | Feb. 15, 1944 |
| 2,374,485 | Haury | Apr. 24, 1945 |
| 2,412,510 | Jones | Dec. 10, 1946 |
| 2,472,347 | Sexton | June 7, 1949 |

FOREIGN PATENTS

| Number | Country | Date |
|---|---|---|
| 574,995 | Great Britain | Jan. 30, 1946 |

OTHER REFERENCES

Thompson et al.: "Botanical Gazette," vol. 107 (1946), pp. 494 and 498.

Hunter: "J. Chem. Soc." (London), 1927, pp. 1209 to 1213.

Certificate of Correction

Patent No. 2,655,445                            October 13, 1953

Charles W. Todd

It is hereby certified that error appears in the printed specification of the above numbered patent requiring correction as follows:

Column 3, line 42, for "adopted" read *adapted*; column 9, line 56, after "dispersing" insert *the*; column 10, line 44, after "to" insert *the*; column 11, line 17, for "seedings" read *seedlings*; lines 66 to 70, for the right hand portion of the formula reading and that the said Letters Patent should be read as corrected above, so that the same may conform to the record of the case in the Patent Office.

Signed and sealed this 24th day of November, A. D. 1953.

[SEAL]

ARTHUR W. CROCKER,
*Assistant Commissioner of Patents.*